United States Patent
Shirakawa

(10) Patent No.: US 7,263,036 B2
(45) Date of Patent: Aug. 28, 2007

(54) TIME CORRECTION SYSTEM IN CLUSTER SYSTEM

(75) Inventor: Toshikuni Shirakawa, Tokyo (JP)

(73) Assignee: NEC Corporation (JP)

( * ) Notice: Subject to any disclaimer, the term of this patent is extended or adjusted under 35 U.S.C. 154(b) by 517 days.

(21) Appl. No.: 10/444,290

(22) Filed: May 23, 2003

(65) Prior Publication Data

US 2003/0221138 A1 Nov. 27, 2003

(30) Foreign Application Priority Data

May 27, 2002 (JP) .............................. 2002-152914

(51) Int. Cl.
*G04C 11/00* (2006.01)
*G04C 11/02* (2006.01)
*H04J 3/06* (2006.01)
*H04L 7/00* (2006.01)
*H04B 15/00* (2006.01)

(52) U.S. Cl. .................... 368/46; 368/47; 370/503; 375/356; 455/502

(58) Field of Classification Search ............. 368/10, 368/46, 47, 52; 370/503; 375/354, 356; 455/502; 709/248; 713/400

See application file for complete search history.

(56) References Cited

U.S. PATENT DOCUMENTS 4,254,492 A * 3/1981 McDermott, III ........... 368/119
4,939,752 A * 7/1990 Literati et al. .............. 370/238
5,301,171 A * 4/1994 Blow et al. .................... 368/46

(Continued)

FOREIGN PATENT DOCUMENTS

JP 02-071354 3/1990

(Continued)

OTHER PUBLICATIONS

English translation of relevant parts of Office Action issued by Japanese Patent Office on Jul. 11, 2006 in connection with corresponding application No. 2002-152914.

(Continued)

*Primary Examiner*—Vit W. Miska
(74) *Attorney, Agent, or Firm*—Ostrolenk, Faber, Gerb & Soffen, LLP

(57) ABSTRACT

Provided is a time correction system which includes a means for performing time correction of time in an operational system device by obtaining standard time information from outside with the operational system device among the devices in the cluster to be a representative device and a means for performing time correction of time in a standby system device having the operational system device as a master and the standby system device as a slave, in which the standby system device obtains time information of the operational system device. The operating state of each device is synchronously controlled so as to set the operational system device as a representative device and also the operational system as a master and the standby system as a slave when there is a change recognized in the operating state, which enables to switch the processing corresponding to the setting.

16 Claims, 9 Drawing Sheets

U.S. PATENT DOCUMENTS

| | | | |
|---|---|---|---|
| 5,428,645 A * | 6/1995 | Dolev et al. | 375/354 |
| 5,870,441 A * | 2/1999 | Cotton et al. | 375/354 |
| 6,370,159 B1 * | 4/2002 | Eidson | 370/503 |
| 6,834,091 B2 * | 12/2004 | Litwin et al. | 375/356 |
| 6,914,914 B1 * | 7/2005 | Flood et al. | 370/503 |
| 6,930,958 B2 * | 8/2005 | Goergen | 368/10 |
| 6,983,160 B2 * | 1/2006 | Drawert | 455/502 |
| 7,007,106 B1 * | 2/2006 | Flood et al. | 709/248 |

FOREIGN PATENT DOCUMENTS

| | | |
|---|---|---|
| JP | 4-24861 | 1/1992 |
| JP | 09-198158 | 7/1997 |
| JP | 2000-349791 | 12/2000 |
| JP | 2001-305256 | 10/2001 |
| JP | 2002-116920 | 4/2002 |

OTHER PUBLICATIONS

Untranslated Office Action issued on Jul. 11, 2006 by the Japanese Patent Office in connection with corresponding Japanese patent application No. 2002-152914.

Office Action issued by the Japanese Patent Office on May 1, 2007 in connection with corresponding Japanese Application No. 2002-152914.

Translation of the Office Action issued by the Japanese Patent Office on May 1, 2007 in connection with corresponding Japanese Application No. 2002-152914.

* cited by examiner

※ Cluster System Operating State in Each Device is Changed.

TIME CORRECTION SYSTEM IN CLUSTER SYSTEM

BACKGROUND OF THE INVENTION

1. Field of the Invention

The present invention relates to a time correction system in a calculator system and, more specifically, to a time correction system in a cluster system.

2. Description of the Related Art

In a system in which a plurality of calculators are connected via a communication network, time in a clock controlled within each calculator becomes gradually shifted from the standard time (reference time) or it becomes relatively shifted between a plurality of the calculators due to various factors. Thus, it is necessary to perform the time correction processing for correcting the time difference in the clocks of each calculator to meet the standard time.

In a system in which a plurality of calculators is connected via a communication network, NTP (Network Time Protocol) is a widely well-known technique for adjusting the time in the clocks of each calculator.

In the NTP, there is a logical hierarchy, for communication using the NTP, in the relation between a plurality of calculators connected to the communication network. A calculator (NTP client), which requires time correction, makes an access (inquiry about time information for time correction) only to the NTP server within the same hierarchy or the hierarchy of one higher rank.

The NTP client obtains the time information from the NTP server and adjusts the time of the clock in the own device. The NTP server of the higher hierarchy holding the standard time information provides the standard time information to the NTP client of the lower hierarchy in response to the access. Moreover, in the highest hierarchy (primary) NTP server in which the standard time (reference time) can be directly referred and provided, the standard time information is referred and provided by means of cesium atom clock, GPS and the like.

NTP is a technique designed not to concentrate accesses on one server for correcting time between a plurality of calculators connected via a communication network. Also, it is designed to improve the accuracy of time synchronization by canceling communication delay time due to circuits.

As the related art, Japanese Patent Application Laid-open No. 2000-349791 discloses a technique for achieving the overall time correction processing in which, in LAN, an NTP client (representative NTP client) among a plurality of calculators makes an access (time inquiry) to the NTP server representatively and the representative NTP client and a group of other NTP clients perform time correction processing (as the second step of the overall processing) separately from the above-described access, so that the NTP server does not receive accesses from a plurality of NTP servers.

Recently, there is an increasing demand for a cluster system (clustering system). The cluster system is a system for executing services and work by building a system by clusters of a plurality of calculators.

In the above-described cluster system, it is also necessary to perform a prescribed time correction processing in regards to time (clock) held by each device constituting the cluster. Generally, in the cluster system, performance and fault resistance are improved by allotting logical operating state (operation mode) to each device according to a prescribed system operation policy corresponding to use of processing so as to operate the devices in cooperation.

A problem will be generated when the above-described related art regarding time correction is applied to the cluster system. The problem will be described below. An access (inquiry about standard time information) is made to a device or means which provides the standard time information placed outside the cluster system having any one of the devices in the cluster system as a representative device. The device, which obtains the standard time information through communication with outside as the representative within the cluster system, is referred to as the representative device in the followings.

First, the representative device obtains the standard time information from an outside device and performs time correction of the inside clock (=a first time correction processing). Further, devices other than the above-described representative device in the cluster performs time correction (=a second time correction processing) by referring to the time of the representative device (the time which has been corrected to the standard time in the above-described first time correction processing). Through those two of time correction processing, the time of each device in the cluster is synchronized. This processing is repeated in the cluster system at a prescribed timing.

Incidentally, the cluster system is a system with a characteristic in which logical operating state (operation mode) such as operational system (act) and standby system (standby) are allotted to each device according to a prescribed policy so as to change (switch the system) the operational system and standby system according to the condition for executing the overall services and work. Thus, there is a problem regarding how to adapt the factors including the operating state of the devices and the irregular change/switching to the time correction processing.

Especially, it is a problem regarding how to adapt the factors including the operating state of the devices and the irregular change/switching to the execution of time correction processing in the cluster system through providing the above-described representative device.

In the basic operation policy of the cluster system, the operational system is a system which directly executes services and work of the system while the standby system stands by in case when the operational system is down (function stopped) and the like without directly executing services and work of the system to be operated and switched to be a new operational system when necessary. There may be a case where a function of taking over the former operational system is added if high availability is desired.

There are devices of operational system and standby system within the cluster system. Provided the device of either system (operating state) is set to be the representative device and performs the time correction processing, there generates irregular switching of systems (change of the operating state) in the cluster system. Thus, there is a problem regarding how to deal with the representative device according to the switching and changing of the system.

As described, when the representative device is set in the cluster system for performing the time correction processing as the cluster system, there is a problem regarding how to perform appropriate time correction processing through adapting the operating state of each device in the cluster and the irregular change/switching.

For example, Japanese Patent Application Laid-open No. 2001-305256 discloses a time synchronizing system in a plurality of calculators. Specifically, it discloses processing capable of switching a master (hot) and a slave (standby) by duplicating the processing unit in order to increase the reliability of the time synchronization program.

However, the duplicated processing and hot/standby structure is only for the processing unit (time synchronization program) for performing time synchronizing processing and not specifically directed to the processing as the cluster system. Thus, it differs from the object of the system of the present invention, which is to provide the time correction processing as the cluster system comprising the operating state of the devices such as operational system and standby system.

SUMMARY OF THE INVENTION

The present invention has been designed to overcome the foregoing problems. A main object of the present invention is to achieve a time correction system which is adapted to a cluster system, in which each device operates according to logical operating state (operation mode) thereby to perform the irregular change/switching of the operating states. Further, specifically, the present invention is directed to provide a time correction system in which a representative device for representing the cluster system is provided for making accesses to an outside device which provides standard time information so as to perform time correction processing as the cluster system accordingly.

In order to achieve the foregoing objects, the time correction system in a cluster system according to the present invention performs time correction by obtaining standard time information from outside via a communication network used in a cluster system which comprises a plurality of devices with operational and standby systems as operating state to be switched for executing processing when necessary. The time correction system comprises: a first time correction processing means for performing time correction of time in an operational system device by obtaining standard time information from outside, having the operational system device as a representative device among the devices in the cluster; a second time correction processing means for performing time correction of time in a standby system device, in which the standby system device obtains time information of the operational system device having the operational system device as a master and the standby system device as a slave in the cluster; and a means for setting the operational system device as the representative device and setting the operational system as a master and the standby system as a slave when there is a change recognized in the operating state through controlling the operating state of each device so as to switch the processing to be corresponded to the setting.

Further, the time correction system in a cluster system according to the present invention performs time correction by obtaining standard time information from outside via a communication network used in a cluster system which comprises a plurality of devices with operational and standby systems as operating state to be switched for executing processing when necessary. Each device comprises: a cluster state control unit for synchronously controlling each operating state of own or other devices via a communication means so as to set an operational system device as a representative device and also an operational system as a master and the standby system as a slave according to the operating state; a first time correction processing unit for performing time correction of time in an operational system device through communicating with an outside device for obtaining standard time information when the representative device is in operation; and a second time correction processing unit for, through communicating in the cluster via a communication means, providing the slave device with information of time in the operational system device when the master is in operation, and for executing time correction of time in the standby system device through obtaining information of time in the operational system device from the master device when the slave is in operation. The cluster state control unit resets the representative device, the master and the slave, when there is a change in the operating state and changes the roles and processing of the own device for the time correction processing accordingly.

Further, it is desirable that the communication between the master and the slave devices for transmitting/receiving time information and the communication for controlling operating state of each device in the cluster be processed on a same network.

Also, it is desirable that the communication between the outside device and the cluster system for transmitting/receiving standard time information, the communication between the master and the slave devices for transmitting/receiving time information and the communication for controlling operating state of each device in the cluster be processed on a same network.

Furthermore, it is desirable that the standard time information be distributed from the outside device of the cluster system to the cluster system and the operational system device in the cluster execute time correction processing of time of the operational system device upon receiving the distributed standard time information.

Further, it is desirable that the cluster system comprise one operational system device and one standby system device and perform time correction processing having the operational system device as a representative device and, at the same time, having the operational system as a master and the standby system as a slave.

Also, it is desirable that the cluster system comprise one operational system device and a plurality of standby system devices and perform time correction processing having one of the operational system device as a representative device and, at the same time, having the operational system as a master and the standby system as slaves.

Further, it is desirable that the cluster system comprise a plurality of operational system devices and one standby system device and perform time correction processing having one of the operational system devices as a representative device and, at the same time, having the operational system as masters and the standby system as a slave. Also, it is desirable that the cluster system comprise a plurality of operational system devices and a plurality of standby system devices and perform time correction processing having one of the operational system devices as a representative device and, at the same time, having the operational systems as masters and the standby systems as slaves.

DETAILED DESCRIPTION OF THE PREFERRED EMBODIMENTS

Figure 1:
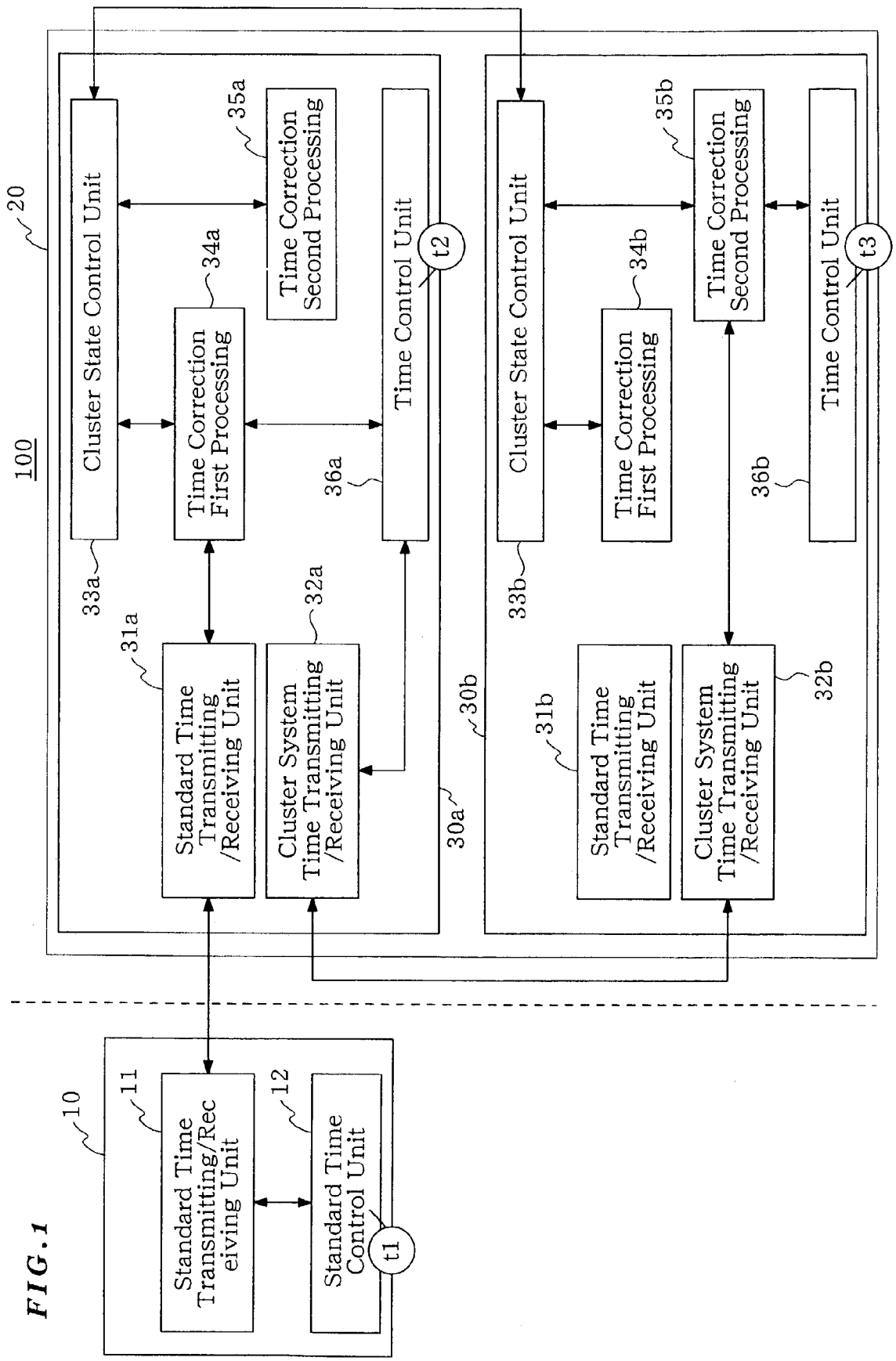
FIG. 1 is an illustration showing the structure of a system 100 for executing time correction system according to a first embodiment of the present invention.

Embodiments of the present invention will be described in detail below by referring to accompanying drawings. FIG. 1 shows a structure of a system 100 in which a time correction system according to a first embodiment of the present invention is executed.

In FIG. 1, the system 100 includes a standard time holding device 10 and a cluster system 20, which are connected via a prescribed communication network.

The cluster system 20 executes the time correction processing in the cluster system based on the time correction system according to the first embodiment of the present invention, that is, processing for correcting (=synchronizing) the time (clock) of each device forming the cluster to meet the standard time.

The standard time holding device 10 is a device or a means for providing standard time information. The cluster system 20 obtains the standard time information from the standard time holding device 10 placed outside via a communication network and performs the time correction processing in the cluster according to the information. The standard time holding device 10, an operational system device 30*a* and a standby system device 30*b* of the cluster system 20 are connected in a prescribed configuration via a communication network.

In the cluster system which performs the time correction of each device within the cluster by obtaining the standard time information from outside via the communication network, the time correction system of the present invention sets a device serving as a representative device of the cluster system among the devices within the cluster, which makes an access (inquiry about the standard time information) to the outside device (10) providing the standard time information.

Especially, the system of the present invention provides the time correction system in the cluster system in the case where the device which can be served as the above-described representative device (device corresponds to a master NTP client in the related art) is limited to the operational system device within the cluster or time correction processing as the cluster system is performed under such policy.

In the present system, the operational system device 30*a* among the devices within the cluster is set as the representative device so as to make an access (inquiry about standard time information) to the device (10) which provides the standard time information from the outside, the representative device corrects the time to meet the standard time (=a first time correction processing). At the same time, in the closed state within the cluster, the operational system device (=representative device) is to function taking a role as a master and the standby system device 30*b* to function taking a role as a slave. The standby system device 30*b* as the slave corrects the time to meet the standard time (=a second time correction processing) according to the time of the operational system device 30*a* as the master.

Further, a means is also provided for executing switching of the processing the roles (representative device, master and slave) of each device in regards to the time correction processing in the cluster system and the switching of processing corresponding to the roles according to the change in the operating state (operation mode) of each device as the cluster system.

Thereby, even if there is irregular system switching (change of the operating state) of the devices in the cluster system, the aligned and appropriate time correction processing is achieved by corresponding to the switching.

In FIG. 1, the standard time holding device 10 is a device which holds standard time information (t1) and comprises a communication means allowing the outside (here, cluster system 20) to obtain the standard time information t1. The standard time holding device 10 comprises a standard time transmitting/receiving unit 11 and a standard time control unit 12. The standard time holding device 10 provides the standard time information t1 in response to the access (inquiry and request for obtaining the standard time information t1) from the devices in the cluster system 20 via the network.

The standard time transmitting/receiving unit 11 comprises an interface function which makes an access to the standard time control unit 12 according to a request from the standard time transmitting/receiving unit 31*a* of the operational system device 30*a* and obtains the standard time information (t1), and transmits it as a response to the cluster system 20 including the information.

The standard time control unit 12 comprises a function of controlling the standard time and a function of returning the standard time information t1 as a response, which is information about the standard time in a prescribed format, in response to a request from the standard time transmitting/receiving unit 11.

The standard time information t1 held and provided by the standard time holding device 10 is the information about the time to be the standard (reference) for the cluster system 20 (and the time correction processing in the cluster system 20). It guarantees the normal operation as the system by correcting the time (clock) of each device in the cluster system 20 to be the standard time. Also, the embodiment includes a processing structure in which the standard time holding device 10 further obtains the standard time information from the device or means of logically higher hierarchy so as to provide the information to the cluster system 20.

Further, it also certainly contains a processing structure in which the standard time holding device 10 serves as the device of logically the highest hierarchy (primary) for providing a prescribed agreed time information. The device in the cluster system 20 obtains the standard time information t1 from the standard time holding device 10 via the network and performs time correction processing within the cluster system 20 according to the information.

The time information transmitted in between the standard time holding device 10 and the cluster system 20 and between each device of the cluster system 20 is data of a prescribed format. However, in the embodiment, it is information made of the standard time information as it is (for example, in a form of "the standard time, 12:34:56"), other control codes and the like. There are other possible structures or systems with more detailed time correction processing, e.g., employing an information structure considering the communication delay in the network, exchanging the correction time amount, or using a phase for transmitting/receiving each of various control information when communicating for time correction. However, as for the embodiment, basically, the standard time information is exchanged between the devices as it is and performs the time correction processing of the time (clock) inside each device according to the information.

The cluster system 20 is built on a network with clusters of a plurality of devices which are physically different so as to improve the performance and fault resistance. Each device cooperates to function as one system and achieve processing such as prescribed services and work according to the situation. It is a distinctive feature that a plurality of devices are not recognized from the user side of the cluster system 20 (permeability). The processing such as the services and work performed by the cluster system 20 is not directly relative to the time correction system of the present invention so that description of the processing and the client device and the like using the system 20 will be omitted.

Basically, each device forming the cluster has the same structure. Each device maintains the logical states such as "operational system" and "standby system" as the operating states (operation modes) in the cluster system 20. Such operating states are allotted to each device by the cluster system 20 to be changed and switched depending on the condition. Change (switching of the system) of the operating state occurs irregularly. Each device forming the cluster performs processing according to the operating state such as the operational system and standby system allotted to itself. Therefore, the device comprises both processing functions as the operational system and standby system and switches them according to the operating state.

The operational system is a system for mainly carrying out the processing (e.g. services and work) of the system, and application programs and the like corresponding to the processing are executed on the device. On the other hand, the standby system is a system having a role of preparing for down (function stopped by faults and the like) of the operational system for taking over the processing of the former operational system when necessary, e.g., when the operational system is down, and for changing the state to be the new operational system.

In the system 100 of the first embodiment, the cluster system 20 physically comprises two devices (30a and 30b). In a normal state, one of the devices is in the operational system mode and the other is in the standby system mode. In FIG. 1, the device on the top is in the operational system state and the device on the bottom is in the standby system state. When switching the system in the system, the operating state of each device is to be switched. Code a is applied to the device and the processing block in the operational system state and code b is applied to the device and the processing block in the standby system state. As described in the above, each device comprises the processing functions of both systems and executes the processing to switch the processing according to the operating state.

The device which is allotted by the system to be the operational system as the operating state comes to have an effective processing function as the operational system device 30a and the device which is allotted by the system to be the standby system as the operating state comes to have an effective processing function as the standby system device 30b. In the cluster system 20 of the first embodiment, through a duplex structure of the operational system and standby system, for example, when the operational system device is down due to faults or the like, the standby system device is switched to be a new operational system device in the system while the down operational system device is switched to be a new standby system device (through recovery processing). The operation of the system is continued through the processing under such policy.

The operational system device 30a of the cluster system 20 comprises a function as the representative device for making an access to the standard time holding device 10 to obtain the standard time information t1, a function of correcting the time (t2) of the clock within the own device according to the obtained standard time information t1, and a function that allows the standby system device 30b to obtain the time information t2 of the clock within the own device for correcting time together with the above-described access and the time correction. The operational system device 30a operates as the master device in the cluster system 20 and performs the time correction processing within the cluster system 20. The device serving as the master is the representative device at the same time.

The standby system device 30b of the cluster system 20 comprises a function of obtaining the time information (t2) from the operational system device 30a and a function of correcting the time (t3) of the clock within the own device according to the obtained time information t2. The standby system device 30b operates as the slave device for the master device within the cluster system 20 and performs the time correction processing within the cluster system 20. The device serving as the slave does not make an access to the standard time holding device 10 placed outside but communicates with the master device (=operational system device) and performs processing to synchronize the time t3 of the clock within the own device with the time t2 of the clock of the master device.

Further, in the cluster system 20, the roles and responsibilities of the processing in regards to the time correction processing within the cluster system change according to the operating state (operation mode) of each device. Thus, all the devices in the cluster comprise a function of always controlling the operating state of the own device and the other devices (devices other than the device itself in the cluster) as well as a communication means used therefore.

Between the two devices in the cluster system 20 of the present embodiment, the former operational system device is switched to the new standby system device and the former standby system device is switched to the new operational system device when there is switching of the system caused by device down due to faults and the like. At the same time, change of the roles and switching of the processing are performed in each device according to the operating state after the change. The operational system is set to be the representative device, the operational system to be the master and the standby system to be the slave. The processing of the processing unit in each device is switched according to the system after the change.

As described, the time correction processing within the cluster is achieved in the form based on the master-slave system at all times through switching the roles and processing according to the operating state of each device of the cluster.

By such structure and processing, the time correcting function as the cluster system can be maintained in case when the system is switched in the cluster system without requiring processing and the like by a service engineer.

In the followings, the processing performed in each processing unit in the devices will be described by each state of operational system and standby system so that it can be easily understood.

The operational system device 30*a* comprises a standard time transmitting/receiving unit 31*a*, a cluster system time transmitting/receiving unit 32*a*, a cluster state control unit 33*a*, a time correction first processing unit 34*a*, a time correction second processing unit 35*a*, and a time control unit 36*a*.

The standard time transmitting/receiving unit 31*a* is a processing unit for the representative device and comprises an interface function which makes an access (inquiry about the standard time information and request for obtaining) to the standard time holding device 10 via a network according to a request (request for time correction) from the time correction first processing unit 34*a*, obtains the standard time information t1 from the standard time holding device 10, and returns the obtained information t1 to the time correction first processing unit 34*a* as a response.

The cluster system time transmitting/receiving unit 32*a* comprises an interface function which reads out the time (t2) of the own device held in the operational system device 30*a* from the time control unit 36*a* according to a request from (the cluster system time transmitting/receiving unit 32*b* of) the standby system device 30*b* via the communication means and returns it to the standby system device 30*b* as a response.

The cluster state control unit 33*a* comprises a function of always controlling the operating state (operating state of the cluster system such as the operational system and standby system) of each device forming the cluster. The cluster state control unit 33*a*, since, especially, the own device is in the operational system state, controls the cluster system operating state of the own device to be the operational system device 30*a* and the cluster system operating state of the other device to be the standby system device 30*b*. Further, the cluster state control unit 33*a* comprises a function of transmitting a request for stopping the processing to the time correction first processing unit 34*a* and a request for starting the processing to the time correction second processing unit 35*a*, respectively, in order to stop the processing performed in the own device as the operational system so as to switch the processing to the standby system when these cluster system operating states are to be changed. In the first embodiment, when the cluster system operating state is changed through switching the system, the former operational system device (30*a*) is to operate as a new standby system device and the former standby system device (30*b*) as a new operational system device.

The time correction first processing unit 34*a* is a processing unit for the operational system and it becomes effective while the device is in operation as the operational system. It comprises a processing function for obtaining the standard time information (t1) from the standard time holding device 10 via the standard time transmitting/receiving unit 31*a* in order to correct the time as the cluster system 20 to the standard time, and for correcting the time t2 within the own device which is controlled by the time control unit 36*a*. Further, the processing is interrupted to change the device to a new standby system device (processing as a new standby system is performed by the time correction second processing unit 35*a*) according to the request for stopping the processing from the cluster state control unit 33*a*.

The time correction second processing unit 35*a* is a processing unit for the standby system and it is ineffective when the device is in operation as the operational system. However, according to the request for starting the processing from the cluster state control unit 33*a*, it is processed and started to be a new standby system device and performs the processing as a new standby system device after the switching of the system.

The time control unit 36*a* comprises a function of controlling the time t2 of the clock of the own device. Further, it comprises an interface function for performing processing of reading out the time from the cluster system time transmitting/receiving unit 32*a* and the time correction processing from the time correction first processing unit 34*a*, and provides the time information t2 according to the request from each processing unit.

The standby system device 30*b* comprises similar processing units to that of the operational system device 30*a*. However, it is in a different operating state from the operational system device 30*a* so that the content of processing to be performed is different. The standby system device 30*b* comprises a standard time transmitting/receiving unit 31*b*, a cluster system time transmitting/receiving unit 32*b*, a cluster state control unit 33*b*, a time correction first processing unit 34*b*, a time correction second processing unit 35*b* and a time control unit 36*b*.

The standard time transmitting/receiving unit 31*b* is a processing unit for the operational system and it is ineffective when the device is in operation as the standby system.

The cluster system time transmitting/receiving unit 32*b* comprises an interface function which reads out and obtains the time information (t2) held in the operational system device 30*a* from (the cluster system time transmitting/receiving unit 32*a* of) the operational system device 30*a* according to a request from the time correction second processing unit 35*b* and returns it to the time correction second processing unit 35*b* as a response.

The cluster state control unit 33*b*, like the cluster state control unit 33*a* of the operational system device 30*a*, comprises a function of controlling the operating state of each device forming the cluster. The cluster state control unit 33*b*, since, especially, the own device is in the standby state, controls the cluster system operating state of the own device as the standby system device 30*b* and the cluster system operating state of the other device as the operational system device 30*a*. Similarly, the cluster state control unit 33*b* comprises a function of transmitting a request for starting the processing to the time correction first processing unit 34*b* and a request for stopping the processing to the time correction second processing unit 35*b*, respectively, in order to stop the processing performed in the standby system so as to switch the processing to the operational system when these operating states are to be changed.

The time correction first processing unit 34*b* is a processing unit for the operational system and it is ineffective when the device is in operation as the standby system. However, according to the request for starting the processing from the cluster state control unit 33*b*, it is processed and started to be a new operational system device and starts to perform the processing as an operational system.

The time correction second processing unit 35b is a processing unit for the standby system and it is effective when the device is in operation as the standby system. The standby system device 30b serves as the slave. The time correction second processing unit 35b comprises a processing function of reading out and obtaining the time information (t2) held in the operational system device 30a as the master device via the cluster system time transmitting/receiving unit 32b and correcting the time (t3) controlled by the time control unit 36b. Further, according to the request for stopping the processing from the cluster state control unit 33b, the processing is interrupted to be changed to a new operational system device (processing as a new operational system is performed by the time correction first processing unit 34b).

The time control unit 36b comprises a function of controlling the time (t3) of the clock within the own device (here, the standby system device 30b) and comprises also an interface function for the time correction processing from the time correction second processing unit 35b.

Figure 2:
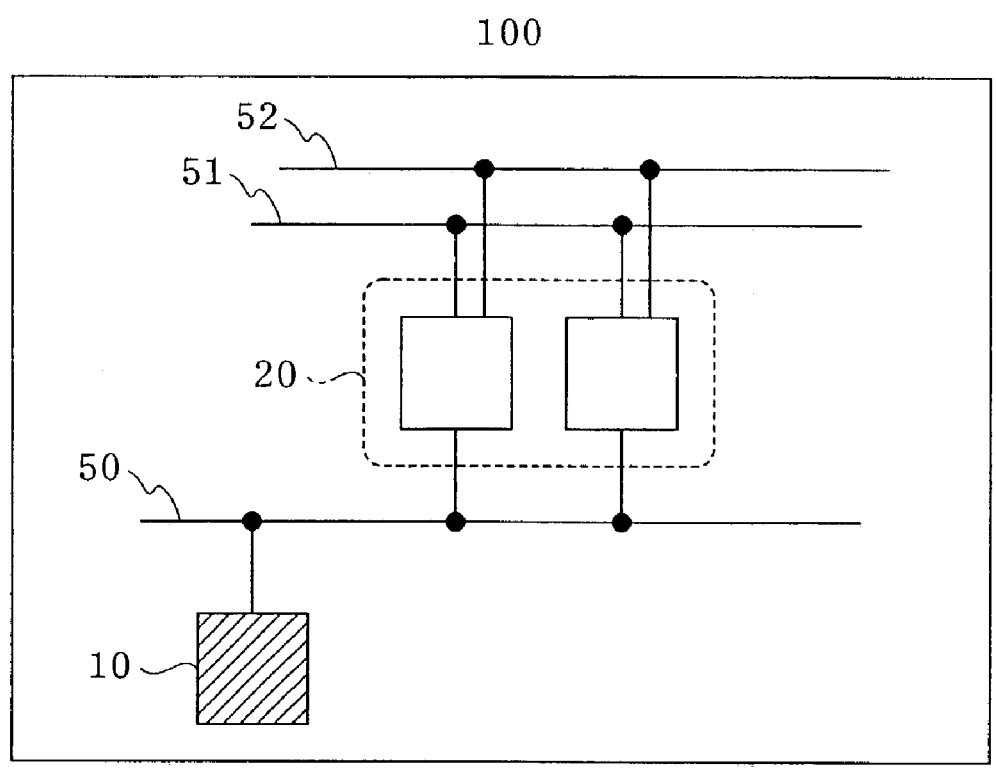
FIG. 2 is an illustration showing the network structure of the system 100.

FIG. 2 is an illustration showing each communication means necessary for the time correction processing in the time correction system. A standard time transmitting/receiving unit 11 of the standard time holding device 10 and the standard time transmitting/receiving unit 31a of the cluster system 20 performs communication between the standard time transmitting/receiving units in a network 50 (typically LAN and the like). The cluster system time transmitting/receiving units 32a and 32b in the cluster system 20 perform communication between the cluster system time transmitting/receiving units in a network 51 and the cluster state control units 33a and 33b in the cluster system 20 perform communication between the cluster state control units in a network 52. The networks 51 and 52 are, for example, communication interface which mutually connect each device in the cluster system 20.

Figure 3:
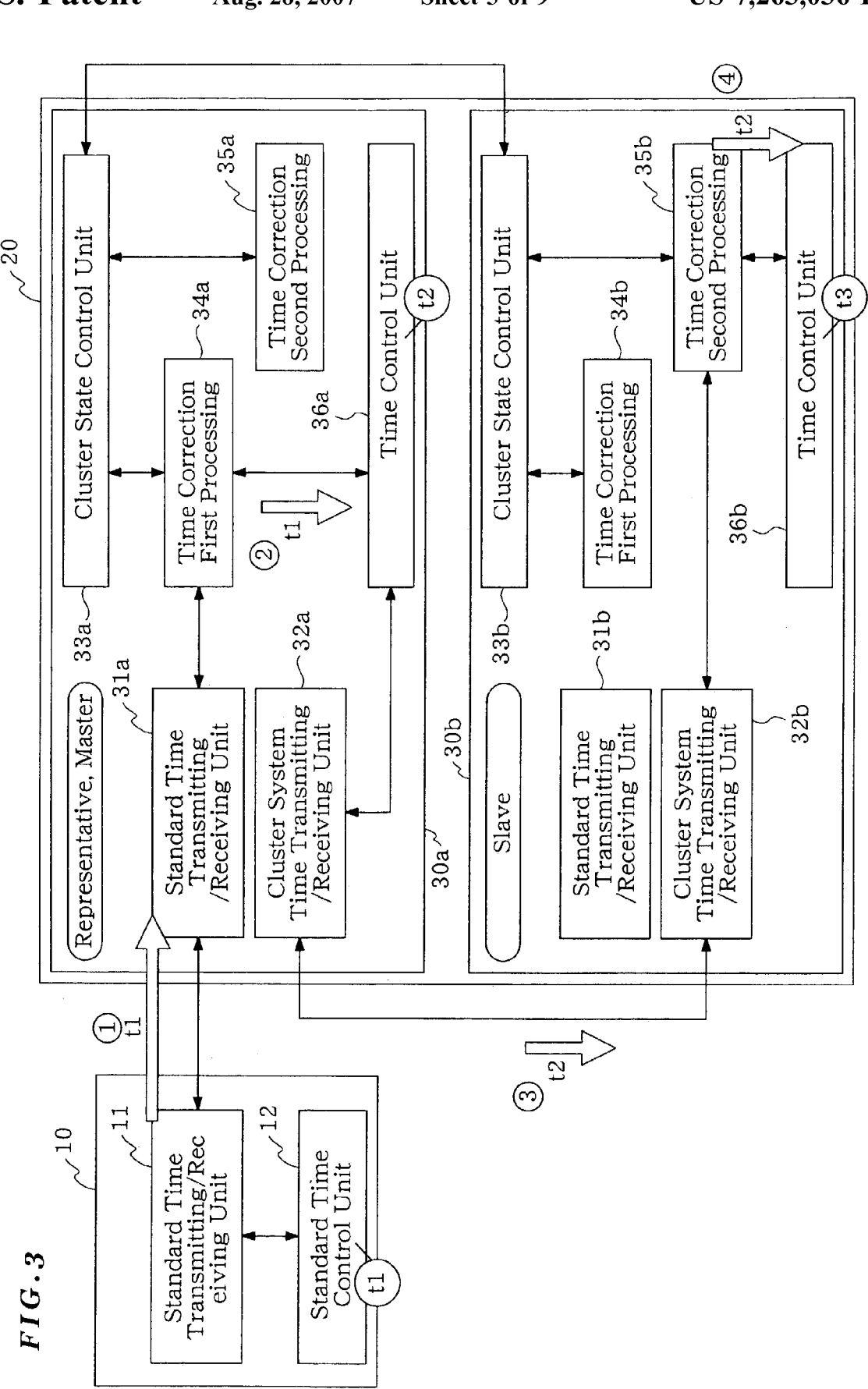
FIG. 3 is an illustration showing the overall flow of time correction processing in the present system.
Figure 4:
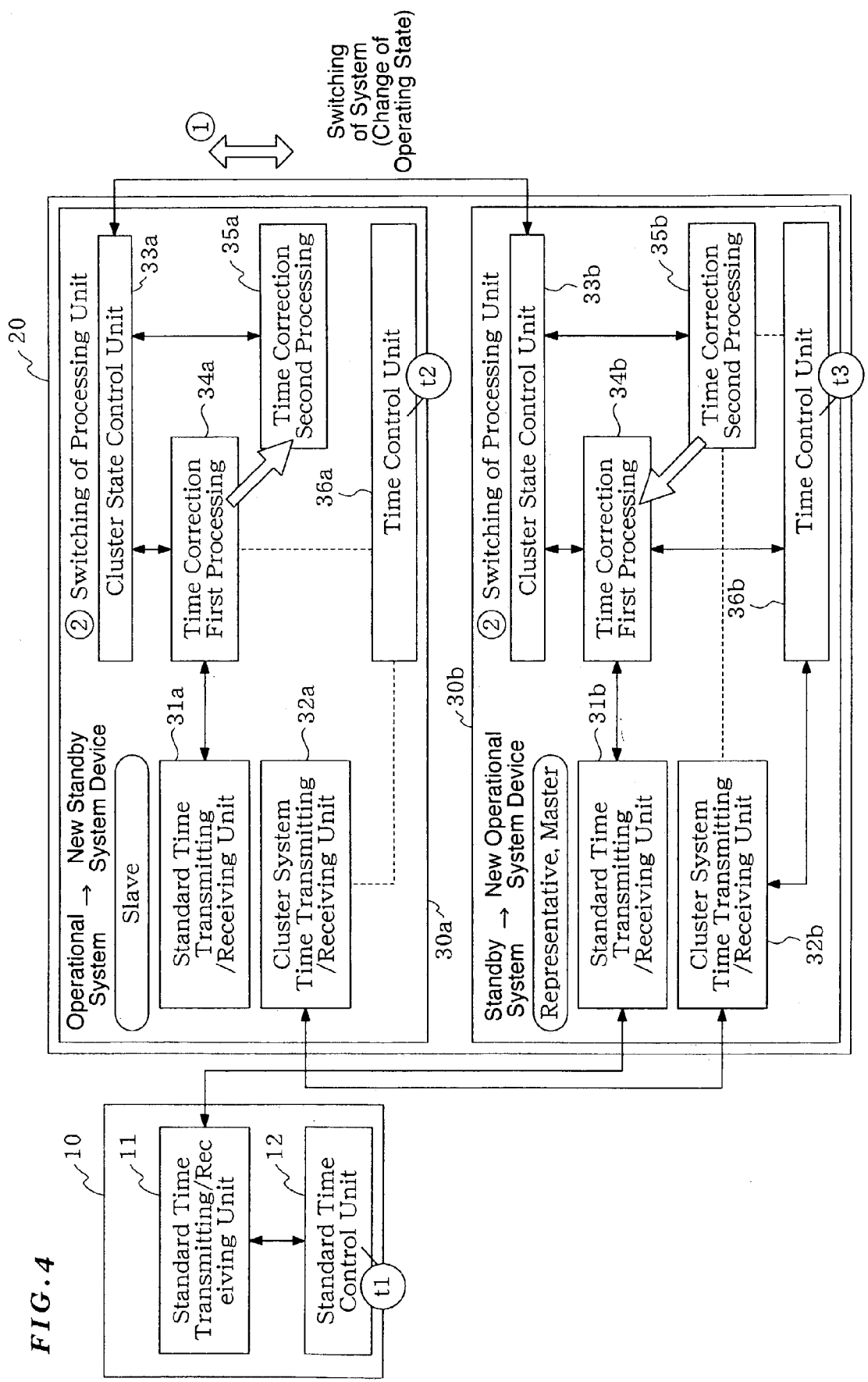
FIG. 4 is an illustration showing the manner in which switching is performed in a cluster system 20.

The overall time correction processing of the system of the invention is roughly divided into three stages of processing. FIG. 3 and FIG. 4 show the outline. In FIG. 3, the device 30a as one of the devices is in the operational system state so that it is set to be the representative device and also to be the master. Also, the device 30b as the other device is in the standby state so that it is set to be in the slave state. First, as the first time correction processing, there is a step in which the operational system device 30a as the representative device in the cluster system obtains the standard time information t1 from the standard time holding device 10 (①) and performs correction of the time t2 within the operational system device (②). Thereby, the operational system device 30a as the representative device is synchronized with the standard time.

Next, as the second time correction processing, the operational system device 30a as the above-described representative device is set to be the master and the standby system device 30b to be the slave for the master. The standby system device 30b as the slave obtains the time t2 of the operational system device 30a through communicating with the operational system device 30b (③) and performs the correction of the time t3 within the standby system device 30b (④). Through this step, the time of the standby system device 30b and the time of the operational system device 30a are synchronized, thereby achieving the purpose which is to synchronize the time of each device within the cluster system 20 with the standard time. The cluster system 20 repeatedly executes such processing at a prescribed timing (for example, at regular intervals).

The above-described processing is repeated while there is no change/switching of the operating state of the devices in the cluster system 20. When there is a change/switching of the operating state, switching of the processing in regards to the time correction processing is executed accordingly. In FIG. 4, each of the cluster state control units 33a and 33b performs synchronization control of the operating state of the cluster system of each device at all times. The cluster state control units 33 perform communication therebetween via the communication means for the synchronization control and, when it is judged that it is necessary to change/switch the operating state in a device or a plurality of devices in the cluster, communication is performed for the purpose to change the operating state of the corresponding device (①). For example, when the operational system device 30a is down (function stopped) due to faults of hardware or software and the standby system device 30b as the other device detects the down, switching is executed in the device of the cluster. The cluster state control units (33a, 33b) of each device performs communication between the each processing unit in the device in regards to the time correction processing according to the request for changing the operating state, and executes the switching of the processing so as to switch the role of the device according to the operating state after the change (②). Here, the role is changed to be the slave, as the operational system is changed to be a new standby system. Also, the role is change to be the master, as the standby system is changed to be a new operational system. Further, the processing is switched in the time correction first processing unit 34 and the time correction second processing unit 35, and the processing of the standard time transmitting/receiving unit 31 is switched according to the change of the representative device in the cluster.

As the above-described second time correction processing, it may have a configuration, in which the standby system device 30b and the operational system device 30a perform communication in the cluster and the standby system device 30b actively makes an access to the operational system device 30a to obtain the time information t2, as the processing configuration at the time of performing the time correction of the time t3 of the standby system device 30b. Further, it may have the processing configuration in which the operational system device 30a side makes an access to the standby system device 30b side for supplying the time information t2.

Figure 5:
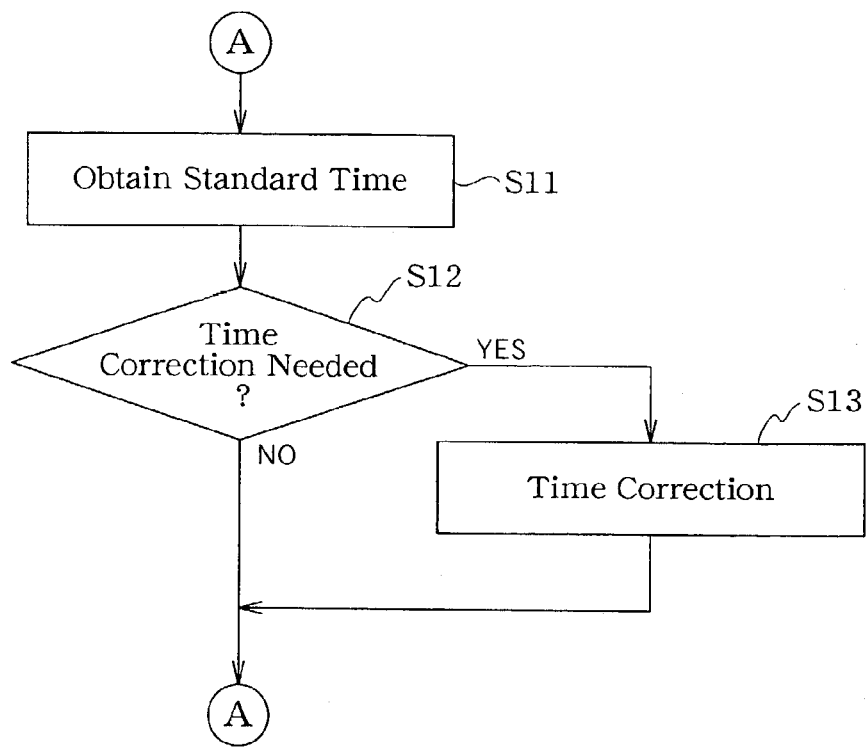
FIG. 5 is a flowchart showing the processing of an operational system.
Figure 6:
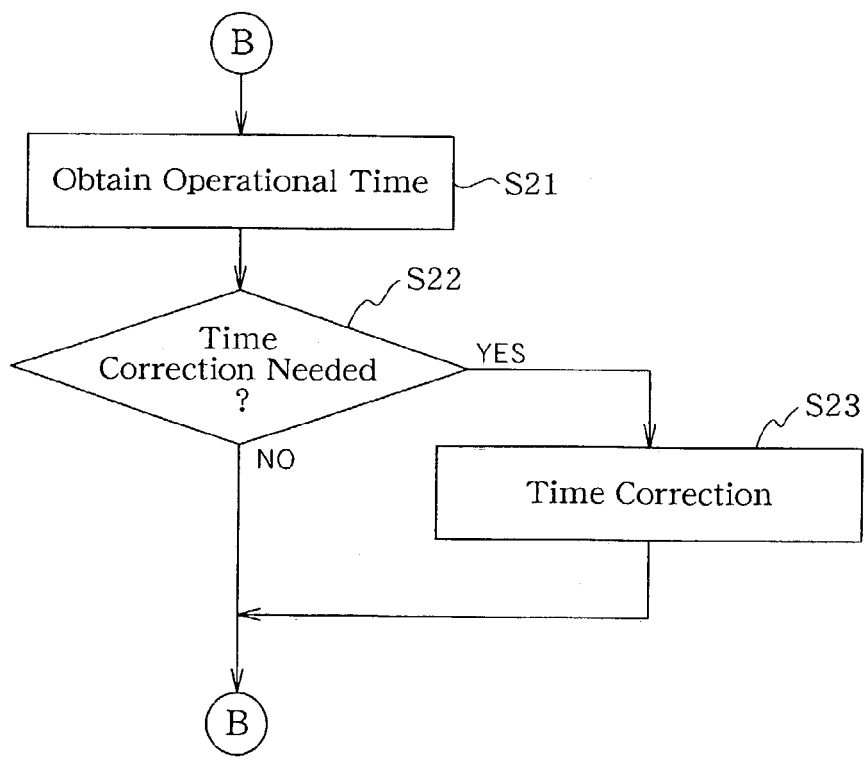
FIG. 6 is a flowchart showing the processing of a standby system.
Figure 7:
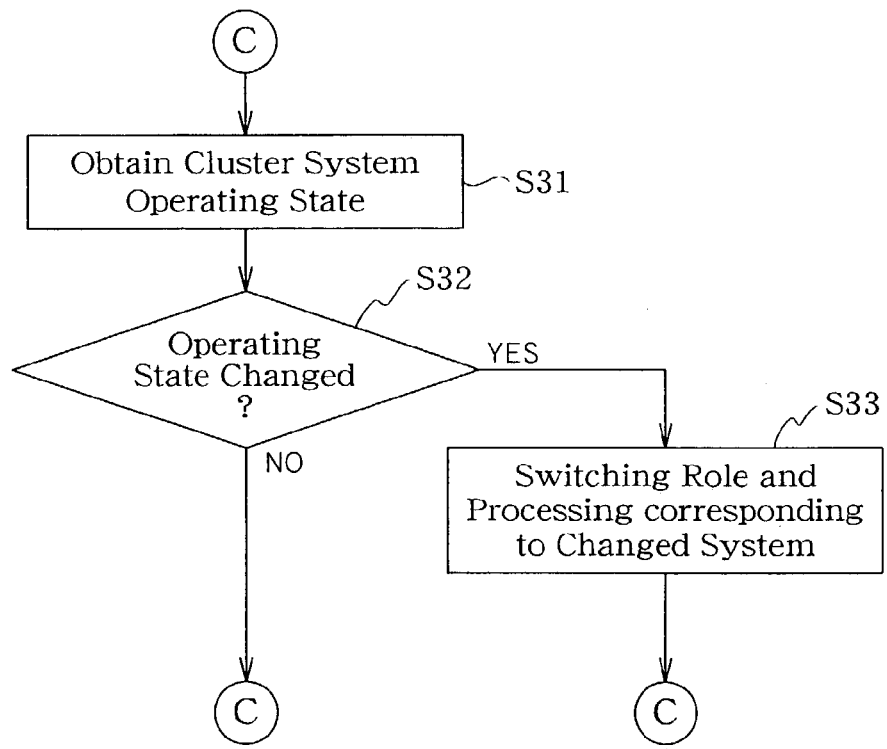
FIG. 7 is a flowchart showing the common processing of the operational system and the standby system.

Next, the operation of the time correction system according to the first embodiment will be described by referring to FIG. 5 to FIG. 7. FIG. 5 is a flowchart showing the processing performed by the operational system device. FIG. 6 is a flowchart showing the processing performed by the standby system device. FIG. 7 is a flowchart showing the processing which is commonly performed by the devices in the cluster regardless of the operating states (operation mode) such as the operational system and the standby system.

In FIG. 5, the operational system device 30a in the cluster system 20 as the representative device obtains, at regular or irregular intervals, the standard time information t1 from the standard time holding device 10 (step S11) via the network 50. Then, it judges whether or not there is a difference between the obtained standard time information t1 and the time t2 of the clock controlled within the device (step S12). When there is a difference of more than a prescribed amount (step S12—YES), the time correction processing is performed (step S13) so that the time t2 is set to meet (or to be close to) the standard time t1. After this, such processing is repeatedly executed as in a loop as long as there is no change in the operating state of the cluster system of the own device.

In FIG. 6, the standby system device 30b in the cluster system 20 as the slave device obtains, at regular or irregular intervals, the time information t2 of the clock of the operational system from the operational system device 30a as the master via the network 51 (step S21).

Then, it judges whether or not there is a difference between the obtained time information t2 of the clock of the operational system and the time t3 of the clock controlled within the device (step S22). When there is a difference of more than a prescribed amount (step S22—YES), the time correction processing is performed (step S23) so that the time t3 is set to meet (or to be close to) the operational time t2. After this, such processing is repeatedly executed as in a loop as long as there is no change in the operating state of the cluster system of the own device.

In FIG. 7, through the cluster state control unit 33, the operational system device 30a and the standby system device 30b in the cluster system 20 mutually perform synchronization control of the operating state of the cluster system via the network 52. Every time when performing the synchronizing processing, information in regards to the operating state of each device is obtained (step S31) so as to judge whether or not there is a change in the operating state of the cluster system, or whether or not it is necessary to change (switch the system) operating state of the device (step S32). When there is a change in the operating state of the cluster system of the device or it requires a change/switching (step S32—YES), processing performed in each device is coercively interrupted even though it is in the middle of the time correction processing (step S3 or step S23), and each processing unit within the device is switched to the role and processing corresponding to the operating states of the cluster system which are newly allotted to the devices. In the case of the embodiment, the processing as the former operational system is switched to the processing as a new standby system and the processing as the former standby system to a new operational system, respectively. The representative device is changed according to the change of the operational system and the operational system is reset as the master and standby systems is reset as the slave. After the processing in the step S33, needles to say, the operating state of the cluster system of the device is being changed.

Through each processing described above, the time correction processing as the cluster system can be achieved in an aligned manner. Aside from the change (switching of the system) in the operating state of the device which can be generated irregularly, the time correction processing (the first and second time correction processing) is repeatedly performed at a prescribed timing. When there is a change in the operating state of the device, the roles and processing of the devices are immediately switched to be adapted to the change and, in the same manner, the time correction processing is also repeatedly executed afterwards.

Figure 8:
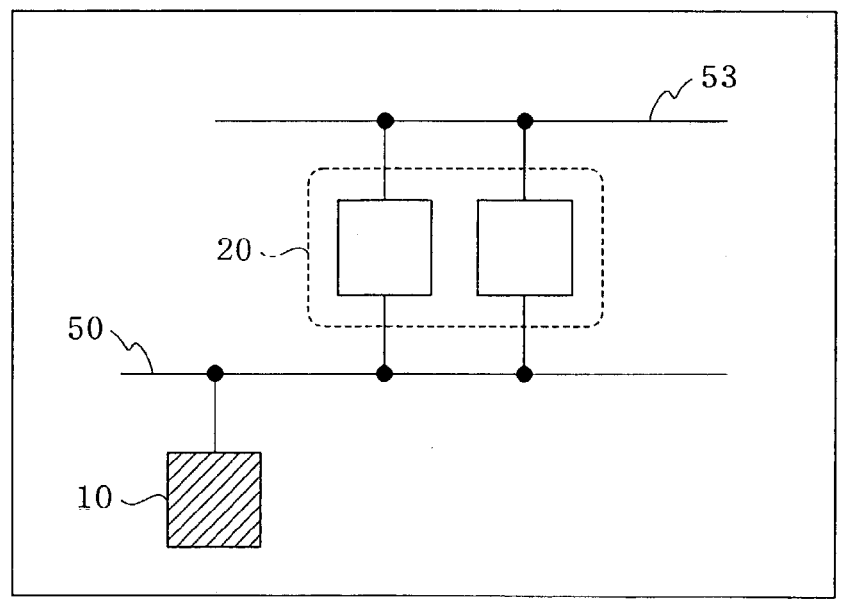
FIG. 8 is an illustration showing the structure of a system for executing time correction system according to a second embodiment of the present invention.

Next, another embodiment of the present invention will be described. In a time correction system according to a second embodiment of the present invention, as for the communication means between each device forming the cluster system, it is simultaneously processed via a network 53 (typically the cluster mutual connection interface and the like) as shown in FIG. 8, unlike the case of the first embodiment in which communication is performed via physically separated the network 51 and the network 52 as shown in FIG. 2. In this case, the second time correction processing and the synchronization control of the operating state of the cluster system are processed through the same network 53. Specifically, communication between the cluster state control units and communication between the cluster system time transmitting/receiving units are performed through the network 53. Further, communication between the standard time transmitting/receiving units are performed through the network 50. Through the structure, a physical restriction on the system structure can be reduced. Other processing is the same as that in the first embodiment.

Figure 9:
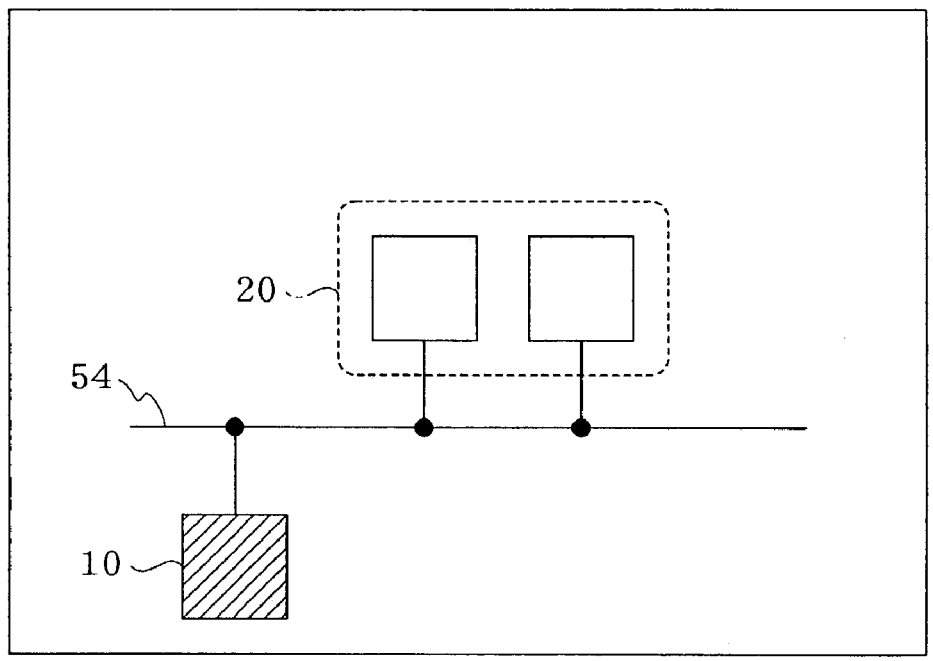
FIG. 9 is an illustration showing the structure of a system for executing time correction system according to a third embodiment of the present invention.

Next, a time correction system according to a third embodiment of the present invention has a structure different from the second embodiment, in which all the communication means between each device of the standard time holding device 10 and the cluster system 20 are collectively processed via the network 54 as shown in FIG. 9. In this case, all of the processing including the first time correction processing, the second time correction processing, and the synchronization control of the operating state of the cluster system is performed via the network 54.

Specifically, communication between the cluster state control units, communication between the cluster system time transmitting/receiving units, and communication between the standard time transmitting/receiving units are performed through the network 54. Through the structure, a physical restriction on the system structure can be reduced. Other processing is the same as that in the first embodiment.

Figure 10:
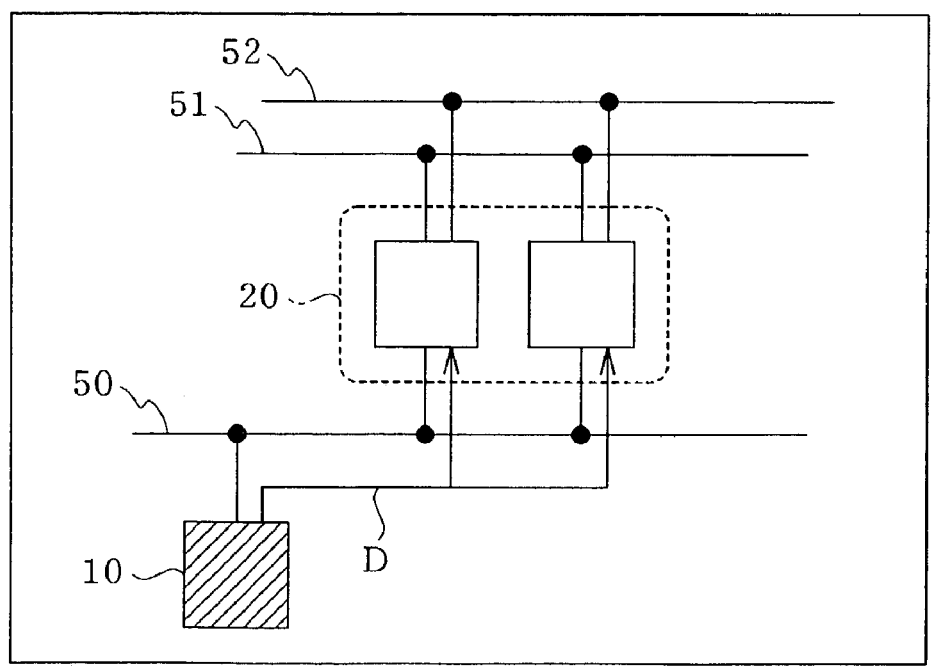
FIG. 10 is an illustration showing the structure of a system for executing time correction system according to a fourth embodiment of the present invention.

Next, in a time correction system according to a fourth embodiment of the present invention, as shown in FIG. 10, performed is a time correction processing which is in a passive form for the cluster system in which the outside device 10 distributes the standard time information t1 at a prescribed timing (for example, at regular intervals) and the device on the cluster system 20 side always receives and collects the distributed standard time information t1 so as to perform the time correction processing. This is different from the above-described embodiments which employ the time correction processing in an active form for the cluster system in which the device on the cluster system 20 side makes an access to the outside device (standard time holding device 10) to obtain the standard time information t1. In the cluster system 20, the operational system device 30a as the representative device listens to the network and waits to receive the standard time information t1 distributed from the standard time holding device 10 placed outside. The operational system device 30a as the representative device performs the time correction of the time t2 of the clock within the own device upon receiving the standard time information t1 through the network. Then, the second time correction processing is performed in the cluster in the same manner as performed in the above-described embodiments.

Next, in a time correction system according to a fifth embodiment of the present invention, a distinctive time correction processing of the present invention is performed not only in the structure formed with two devices as the cluster system as in the first embodiment but also in a cluster system formed with three or more devices, in which, in the same manner, the role and processing of each device is switched according to the operating state of the cluster system allotted to the device.

Figure 11:
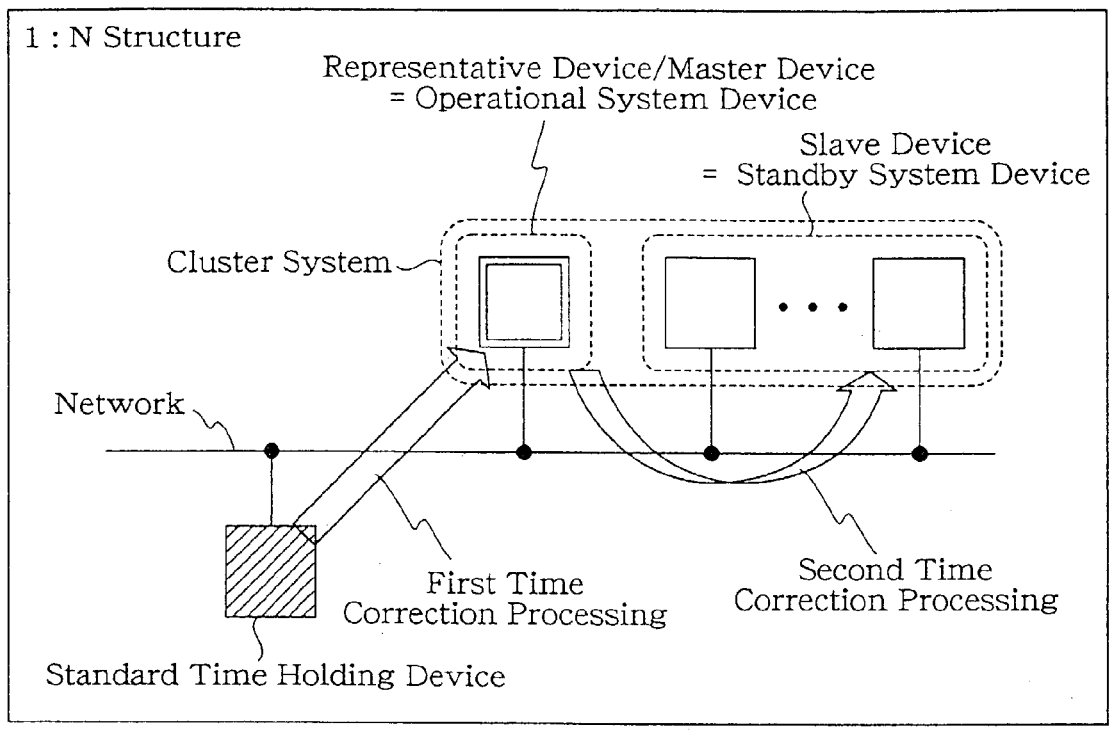
FIG. 11 is an illustration showing the structure of a system (1) (1:N structure) for executing time correction system according to a fifth embodiment of the present invention.

First, there is a case where the cluster is formed with one operational system device and a plurality of standby system devices (FIG. 11—structure 1, 1:N structure). In this case, the one operational system device serves as the representative device and also as the master device. All of a plurality of the standby system devices are to be the slave devices. A plurality of the standby systems=slave devices perform communication with one operational system=master device via the cluster system time transmitting/receiving unit so as to obtain the time t2 of the master device and execute the time correction processing of the time t3 in each slave device. When the systems are switched in the system at the time when the one operational system device is down and the like, one of a plurality of the standby system devices is changed to be a new operational system. At this time, the device to be the new operational system is reset to be the representative device and the master.

Figure 12:
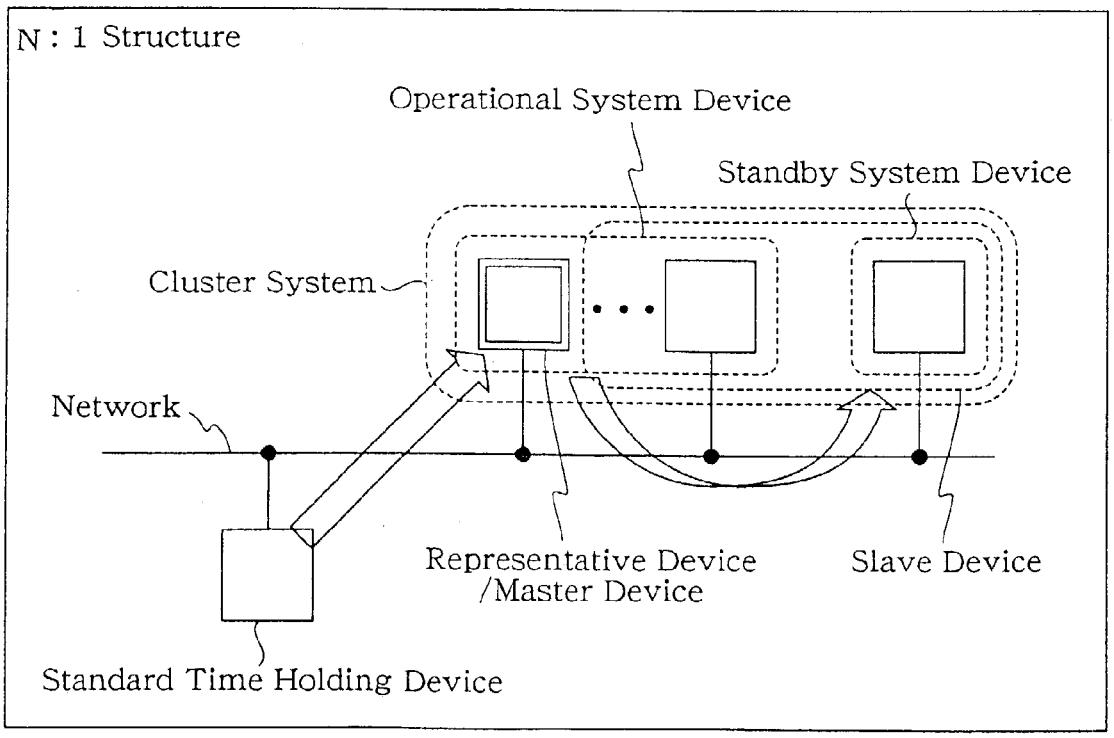
FIG. 12 is an illustration showing the structure of a system (2) (N:1 structure) for executing time correction system according to the fifth embodiment of the present invention.

Further, there is a case where the cluster is formed with a plurality of operational system devices and one standby system device (FIG. 12—structure 2, N:1 structure). In this case, one of the operational system devices is set to be the representative device and also to be the master device. Other operational system devices and one standby system device are all set to be the slave devices thereby to perform the first and the second time correction processing. A plurality of the slave devices (operational or standby system) perform communication with one operational system=master device via the cluster system time transmitting/receiving unit so as to obtain the time t2 of the master device and execute the time correction processing of the time t3 in each slave device.

When the system is switched in the system at the time when the operational system device is down or the like, the standby system device is changed to be a new operational system. At this time, when the representative device is down and changed to be the standby system, the device to be the new operational system is reset to be the representative device and the master. As another way of performing the processing, any one of a plurality of operational system devices is set to be the representative device, a plurality of the operational system devices to be the masters, and one standby system device to be the slave.

The second time correction processing is divided into two stages. First, the time correction processing is performed in the group of the operational system devices as the masters. Then the standby system device as the slave performs the time correction processing between one of the master devices. As another way of performing processing, it is possible to set all of the operational system devices as the representative devices and the masters.

Each of a plurality of the operational system devices performs the first time correction processing via an interface (the standard time transmitting/receiving unit 31) which enables to obtain the standard time information t1 from outside. The standby system device as the slave performs the second time correction processing between with one of the operational system devices.

Figure 13:
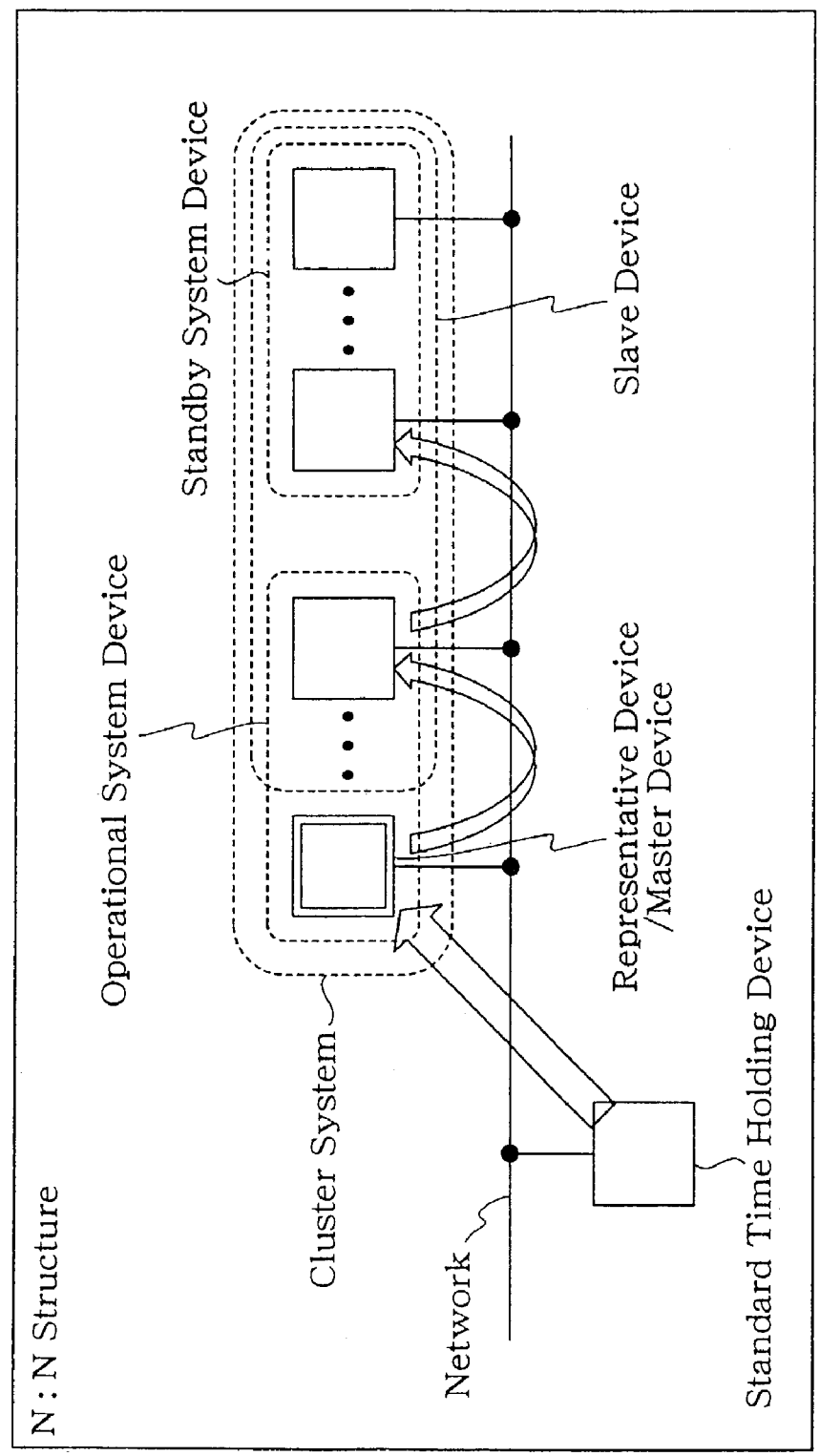
FIG. 13 is an illustration showing the structure of a system (3) (N:N structure) for executing time correction system according to the fifth embodiment of the present invention.

Furthermore, there is a case where the cluster is formed with a plurality of operational system devices and a plurality of standby system devices (FIG. 13—structure 3, N:N structure). In this case, as in the way of processing as described above, one of the operational system devices is set to be the representative device and also to be the master device. Other operational system devices and a plurality of the standby system devices are all set to be the slave devices thereby to perform the first and second time correction processing.

A plurality of the standby systems slave devices perform communication with one operational system=master device via the cluster system time transmitting/receiving unit so as to obtain the time t2 of the master device and execute the time correction processing of the time t3 in each slave device. When the system is switched in the system at the time when the operational system device is down or the like, one of a plurality of the standby system devices is changed to be a new operational system. At this time, when the representative device is down and changed to be the standby system, the device to be the new operational system is reset to be the representative device and also to be the master.

Similarly, as another way of processing, any one of a plurality of operational system devices is set to be the representative device, a plurality of the operational system devices to be the masters, and a plurality of standby system devices to be the slaves.

Further, similarly, as another way of processing, it is also possible to set all of a plurality of operational system devices to be the representative devices and also to be the master devices. Each of a plurality of the operational system devices performs the first time correction processing via an interface which enables to obtain the standard time information t1 from outside. A plurality of the standby system devices as the slaves perform the second time correction processing between with one of the operational system devices. The response/reference relation between the operational system devices and the standby system devices may be set beforehand so as to perform the second time correction processing accordingly.

Furthermore, it is possible to employ a processing structure in which a device selected from a group consisting of a plurality of the standby system=slave devices is set to be a first slave thereby to refer to the time of the representative device for performing the time correction processing in the first slave. Further, another group consisting of other second slave devices may refer to the time of the first slave thereby to perform the time correction processing in the second slaves.

The present invention has been described by referring to the embodiments. However, the above-described embodiments are to show examples of the preferred embodiments of the present invention and the present invention is not limited thereto but various modifications are possible within the sprit and broad scope of the appended claims.

As described heretofore, with the present invention, it is unnecessary to perform the time correction processing by a service engineer and the like even if there is a change (switching of the system) in the operating state of the devices in the cluster system generated at irregular intervals. The reason is that the invention provides the system in which the form of the time correction processing is automatically switched in accordance with the operating state of the cluster system. In the system, each device always monitors the operating state allotted to each device of the cluster so as to perform synchronization control and the role and processing of each device is switched accordingly (the operational system device is set to be the representative device, and the operational system to be the master and the standby system to be the slave, respectively) when there is a change (switching of the system) in the operating state.

Further, when there is a change (switching of the system) in the operating state of the cluster system, the processing can be taken over smoothly through restarting as the cluster system with substantially no difference between the standard time in each device. The reason is that the time correction processing is performed on the standby system device side at all times before the changes (switching of the system) in the operating state generated at irregular intervals in the cluster system, so that the difference between the time to be corrected in the new operational system device can be suppressed after the switching of the system. Thus, it can avoid such a case that the time correction processing is performed right after the switching of the system to face a rapid start-up processing.

Furthermore, it enables to perform the time correction processing of the clock of the standby system device even in the case where it is difficult for the standby system device side to comprises an interface unit which enables to obtain the standard time information from the outside device in the cluster system. Since, in general, most of the operational system devices in the cluster system are allowed to comprise the interface unit which enables to obtain the standard time information from the outside device, through employing a structure, in which the operational system device represents the devices of the cluster to obtain the standard time information from the outside device for performing time correction, and which further comprises a communication means for transmitting/receiving the time information within the cluster, it becomes possible for the standby system device to perform time correction using the time controlled by the operational system device as the standard time.

Furthermore, physical restriction of the system structure can be reduced through arranging each communication means as one to be used for the time correction processing. Also, it is possible to achieve the time correction processing as the cluster system in the same manner using distribution type (passive type) processing in which the outside device distributes the standard time information to the cluster system. Further, it can provide the time correction processing corresponding to various cluster system structure with different number of forming devices and the corresponding system application.

What is claimed is:

1. A time correction system for performing time correction by obtaining standard time information from outside the time correction system via a communication network, the time correction system operable in a cluster system comprising a plurality of devices, an operation state of each device of the plurality of devices being switched between one of an operating state and a standby state as necessary for executing processing by the cluster system, the time correction system comprising:

first time correction processing means for performing time correction in a device switched to the operating state by obtaining standard time information from the outside, having the device switched to the operating state as a representative device among the devices in the cluster system, the representative device for obtaining the standard time information from the outside;

second time correction processing means for performing time correction in a device switched to the standby state, the device switched to the standby state obtaining time information of the device switched to the operating state, having the device switched to the operating state as a master and the device switched to the standby state as a slave in the cluster system; and means for setting the device switched to the operating state as the representative device and as a master and for setting the device switched to the standby state as a slave when there is a change recognized in the operation state through controlling the operating state of each device of the cluster system so as to switch time correction processing to correspond to the settings.

2. The time correction system according to claim 1, wherein communication between the master and slave devices for transmitting/receiving time information and communication for controlling the operation state of each device in the cluster system are processed on a same network.

3. The time correction system according to claim 1, wherein communication between a device on the outside and the cluster system for transmitting/receiving standard time information, communication between the master and the slave devices for transmitting/receiving time information and communication for controlling operating state of each device in the cluster are processed on a same network.

4. The time correction system according to claim 1, wherein standard time information is distributed from the outside to the cluster system, and the device switched to the operating state in the cluster executes time correction processing of time of remaining devices switched to the operating state upon receiving the distributed standard time information.

5. The time correction system according to claim 1, wherein the cluster system comprises one device switched to the operating state and one device switched to the standby state, and performs time correction processing having the device switched to the operating state as a representative device and, at the same time, having the device switched to the operating state as a master and the device switched to the standby state as a slave.

6. The time correction system according to claim 1, wherein the cluster system comprises one operational system device and a plurality of standby system devices and performs time correction processing having the operational system device as a representative device and, at the same time, having the operational system as a master and the standby systems as slaves.

7. The time correction system according to claim 1, wherein the cluster system comprises a plurality of operational system devices and one standby system device and performs time correction processing having one of the operational system devices as a representative device and, at the same time, having the operational system as masters and the standby system as a slave.

8. The time correction system according to claim 1, wherein the cluster system comprises a plurality of operational system devices and a plurality of standby system devices and performs time correction processing having the operational system devices as a representative device and, at the same time, having the operational systems as masters and the standby systems as slaves.

9. A time correction system for performing time correction by obtaining standard time information from outside of the time correction system via a communication network, the time correction system operable in a cluster system comprising a plurality of devices, an operation state of each device of the plurality of devices being switched between one of an operating state and a standby state as necessary for executing processing by the cluster system, wherein each device of the plurality of devices comprises:

a cluster state control unit for synchronously controlling the operation state of the device it comprises or of other devices of the cluster system so as to set a device switched to the operating state as a representative device and as a master and to set a device switched to the standby state as a slave device;

a first time correction processing unit for performing time correction in a device switched to the operating state through communicating with an outside device on the outside of the time correction system for obtaining standard time information when the representative device is in operation; and a second time correction processing unit for providing, through communicating via a communication means, the slave device with time information from the device switched to the operating state when the master is in operation, and for executing time correction in the device switched to the standby state through obtaining the time information in the device switched to the operating state from the master device when the slave device is in operation, wherein the cluster state control unit resets the representative device, the master device and the slave device when there is a change in the operation state of a first device of the cluster system and changes time correction processing to correspond to the settings.

10. The time correction system according to claim 9, wherein communication between the master and slave devices for transmitting/receiving time information and communication for controlling the operation state of each device in the cluster system are processed on a same network.

11. The time correction system according to claim 9, wherein communication between the outside and the cluster system for transmitting/receiving standard time information, communication between the master and the slave devices for transmitting/receiving time information and communication for controlling the operation state of each device in the cluster are processed on a same network.

12. The time correction system according to claim 9, wherein standard time information is distributed from the outside to the cluster system and the device switched to the operating state in the cluster executes time correction processing of the device switched to the operating state upon receiving the distributed standard time information.

13. The time correction system according to claim 9, wherein the cluster system comprises one operational system device and one standby system device and performs time correction processing having the operational system device as a representative device and, at the same time, having the operational system as a master and the standby system as a slave.

14. The time correction system according to claim 9, wherein the cluster system comprises one operational system device and a plurality of standby system devices and performs time correction processing having the operational system device as a representative device and, at the same time, having the operational system as a master and the standby systems as slaves.

15. The time correction system according to claim 9, wherein the cluster system comprises a plurality of operational system devices and one standby system device and performs time correction processing having one of the operational system devices as a representative device and, at the same time, having the operational systems as masters and the standby system as a slave.

16. The time correction system according to claim 9, wherein the cluster system comprises a plurality of operational system devices and a plurality of standby system devices and performs time correction processing having the operational system devices as a representative device and, at the same time, having the operational systems as masters and the standby systems as slaves.

* * * * *